US011901153B2

(12) United States Patent
Swanson et al.

(10) Patent No.: US 11,901,153 B2
(45) Date of Patent: Feb. 13, 2024

(54) X-RAY MACHINE

(71) Applicant: PCT Ebeam and Integration, LLC, Davenport, IA (US)

(72) Inventors: Karl E. Swanson, Davenport, IA (US); John Charles Drenter, Davenport, IA (US); Paul Michael Fletcher, Chelmsford, MA (US)

(73) Assignee: PCT Ebeam and Integration, LLC, Davenport, IA (US)

(*) Notice: Subject to any disclaimer, the term of this patent is extended or adjusted under 35 U.S.C. 154(b) by 217 days.

(21) Appl. No.: 17/249,558

(22) Filed: Mar. 5, 2021

(65) Prior Publication Data

US 2022/0285120 A1 Sep. 8, 2022

(51) Int. Cl.

| | |
|---|---|
| ***H01J 35/08*** | (2006.01) |
| ***H01J 35/18*** | (2006.01) |
| ***H01J 35/12*** | (2006.01) |
| ***H01J 35/06*** | (2006.01) |

(52) U.S. Cl.

CPC ............. *H01J 35/116* (2019.05); *H01J 35/13* (2019.05); *H01J 35/18* (2013.01); *H01J 35/06* (2013.01); *H01J 35/186* (2019.05); *H01J 2235/068* (2013.01); *H01J 2235/1204* (2013.01); *H01J 2235/1262* (2013.01); *H01J 2235/165* (2013.01); *H01J 2235/168* (2013.01); *H01J 2235/18* (2013.01)

(58) Field of Classification Search

CPC .......... H01J 35/06; H01J 35/116; H01J 35/13; H01J 35/18; H01J 2235/165; H01J 2235/18

See application file for complete search history.

(56) References Cited

U.S. PATENT DOCUMENTS

| | | | | |
|---|---|---|---|---|
| 2,896,105 A * | 7/1959 | Hosemann | .............. | H01J 35/02 378/134 |
| 3,612,941 A | 10/1971 | Nablo et al. | | |
| 3,780,308 A | 12/1973 | Nablo | | |
| 3,859,534 A * | 1/1975 | Loughlin | ................ | H05G 1/04 378/125 |
| 4,246,297 A | 1/1981 | Nablo et al. | | |

(Continued)

OTHER PUBLICATIONS

Charlton, Ernest, "X-ray tube", (2020), McGraw Hill, Access Science, pp. 1-5 (Year: 2020).*

*Primary Examiner* — Chih-Cheng Kao
(74) *Attorney, Agent, or Firm* — Woodard, Emhardt, Henry, Reeves & Wagner, LLP

(57) ABSTRACT

An x-ray apparatus includes a vacuum chamber that includes a window for exit of x-rays. Electrons are generated at a cathode within the vacuum chamber and accelerated toward a target anode associated with the window. An x-ray generating layer is included as a surface of the target anode to receive the electrons emitted by the cathode and to create x-rays. A blocking path blocks over 70% of the free electrons reaching said target anode from continuing on to exit through the window, while allowing x-rays leaving the x-ray generating layer to continue along the selectively blocking path to exit through the window. The x-ray apparatus is capable of operating at low voltage and relatively high power to reduce the necessary shielding and the corresponding weight of the apparatus yet allow more ready absorption of x-rays by items being irradiated.

23 Claims, 5 Drawing Sheets

(56) References Cited

U.S. PATENT DOCUMENTS 4,252,413 A 2/1981 Nablo
4,591,756 A 5/1986 Avnery
4,652,763 A 3/1987 Nablo
4,725,938 A * 2/1988 Onodera .................. H05G 1/20 363/28
5,077,135 A 12/1991 Wyman
5,189,602 A * 2/1993 Callier ..................... H05G 1/32 363/28
5,194,742 A 3/1993 Avnery et al.
5,236,159 A 8/1993 Avnery et al.
5,420,906 A * 5/1995 Smit ..................... H01J 35/186 378/143
5,635,714 A 6/1997 Nablo et al.
6,212,255 B1 4/2001 Kirk
6,389,099 B1 5/2002 Gueorguiev
6,426,507 B1 7/2002 Rangwalla et al.
6,463,123 B1 * 10/2002 Korenev .................. H05H 6/00 378/68
6,614,876 B1 9/2003 Kirk
7,346,147 B2 3/2008 Kirk et al.
7,515,686 B2 4/2009 Kirk
8,472,584 B2 6/2013 Lindsay
9,484,177 B2 11/2016 Ausburn
9,818,569 B2 11/2017 Ausburn
10,080,276 B2 9/2018 Hartman et al.
2002/0154740 A1 * 10/2002 Avnery .................. H01J 35/116 378/143
2005/0084572 A1 4/2005 Lindsay et al.
2007/0044905 A1 * 3/2007 Fitts ...................... B32B 37/153 156/244.11
2007/0274443 A1 * 11/2007 Groves .................... G01N 9/36 378/54
2010/0008471 A1 * 1/2010 Morton ................... H01J 35/13 378/143
2011/0256378 A1 10/2011 Collins et al.
2012/0133265 A1 * 5/2012 Kakonyi ................ H01J 35/116 313/163
2015/0078532 A1 * 3/2015 Tang ..................... H01J 35/066 378/92
2016/0228076 A1 * 8/2016 Utsumi .................... A61B 6/02
2018/0047540 A1 2/2018 Ausburn
2021/0241991 A1 * 8/2021 Canazon ................ H01J 35/116

* cited by examiner

X-RAY MACHINE

BACKGROUND

X-ray machines may be used in a variety of applications. For example, an x-ray machine may be used to sterilize, to cure adhesives or polymers, or for substantially reducing bacteria or viruses (commonly known also as inactivation or disinfection) on various products or foodstuffs and other bio-based materials. X-rays are generated by accelerating electrons toward a target material. The interaction of the electrons with the target material causes the target material to emit radiation in the form of x-rays. In some instances, the x-rays may be directed as a beam that is used to irradiate a product or in another desired application.

In addition to generating radiation, the acceleration of the electrons and their impingement on the target material creates heat. The amount of heat depends on the number of electrons impinging on the target (current flow) and on the voltage used to accelerate the electrons toward the target material.

When higher voltages are used, correspondingly higher energies of x-rays are generated. This may be desirable for use with large materials to be treated for which deeper penetration and less immediate absorption of the x-rays may result. However, such systems need correspondingly more costly shielding to safely protect others in the vicinity. Such systems may not be desirable for smaller materials through which more of the x-rays may inefficiently pass before they are absorbed.

When lower voltages are used, correspondingly lower energies of x-rays are generated. Prior art systems using lower voltages have been correspondingly small in size for processing smaller items. They allow for lower cost shielding. This may be desirable for use with smaller materials for which more immediate x-ray absorption is preferred, but such systems have had a correspondingly lower capacity. Using multiple lower voltage systems to process smaller items is more expensive, so when higher capacity is needed, the conventional response is to use higher voltages with more bulk in the materials to be treated, impracticable for in-line processing. Thus, there is a need for improvement in this field.

SUMMARY

An x-ray apparatus is shown that may include a vacuum chamber having a window for exit of x-rays that includes an exterior surface outside of the vacuum in the chamber. The x-ray apparatus includes a cathode within the vacuum chamber and a target anode associated with the window. The target anode has an interior surface within the vacuum chamber. A power supply is connected between the cathode and target anode whereby free electrons are accelerated in their flow from the cathode to the target anode within the vacuum chamber. The voltage of the power supply is less than 400 kV but the power provided by the power supply is preferably more than 80 kW.

The target anode surface comprises an associated x-ray generating layer comprising one or more of the elements with an atomic number equal to or greater than 73. A selectively blocking path begins at the x-ray generating layer and continues through the remaining portion of the target anode and on through the window. The path blocks over 70% of the free electrons reaching the target anode from continuing on to exit through the window, while allowing x-rays leaving the x-ray generating layer to continue along that path to exit through the window. In preferred embodiments, the path blocks over 95% of the free electrons reaching the target anode from continuing on to exit through the window, while allowing x-rays leaving the x-ray generating layer to continue along that path to exit through the window. A liquid cooling pathway is associated with the target anode preferably between the x-ray generating layer and the exterior surface of the window for heat transfer from the target anode.

In some embodiments, the cathode of the x-ray apparatus comprises at least four separate and non-collinear filaments. Additionally, in some instances, the target anode has a solid structure, the majority of which comprises aluminum, the liquid in the cooling pathway comprises water, and the x-ray generating layer comprises gold. In some embodiments, over 60% of the x-rays generated in the x-ray generating layer proceed in a path within 30° of a line through the nearest point on the cathode and the point of generation of the x-ray, as measured with the vertex of the 30° measurement at the point of generation and extending outward through the window.

In another embodiment, the x-ray apparatus may include a vacuum chamber having a wall and a window in the wall to allow exit of x-rays with a vacuum existing in the chamber. A cathode assembly is housed within the vacuum chamber, and the cathode assembly includes at least four non-contiguous filaments. A liquid cooled window anode incorporates a cooling path in which sides of the cooling path provide structural support for the window to keep a vacuum in the chamber. A power supply may be connected between the cathode and anode, whereby free electrons are accelerated in their flow from the cathode to the anode within the vacuum chamber. In some embodiments, the voltage difference between the cathode assembly and the target is less than 400 kV. Preferably, this voltage difference may be between 200 kV and 320 kV.

The anode may contain a base plate and a thin layer of a target material that has an atomic number equal to or greater than 73. In some embodiments, the thin layer may be gold or platinum. Additionally, in some embodiments, the base plate may be formed from aluminum. The layer of target material is of sufficient thickness that the majority of electrons reaching the anode will be absorbed by the thin layer and of sufficient thinness that most of the resulting x-rays can exit the other side of the thin layer and thereafter exit from the anode through the window. In some embodiments, the layer is on adjacent curved surfaces made of aluminum or copper. In some embodiments, the base plate may include stepped surfaces that include risers, and the risers may have sides perpendicular to the parallel, stepped surfaces. In some embodiments, the cooling path is between the base plate with stepped surfaces and curved segments that are coated with the target material.

In some instances, the x-ray apparatus may include a reaction chamber having one or more shielded sides. The chamber may be configured to hold a product to be treated and positioned to receive x-rays passing through the window and into the reaction chamber for irradiation of product to be treated in the reaction chamber. In some embodiments, the majority of the sides of the reaction chamber average shielding of less than the equivalent of 2.0 inches of lead shielding. In other embodiments, the majority of area of the sides of the reaction chamber have an average shielding of less than the equivalent of 1.5 inches of lead shielding. In one example, the majority of the area of at least one side of shielding is no more than the equivalent of 1.25 inches of lead.

In some embodiments, an x-ray apparatus includes modular cathodes and modular anodes. The use of a modular design may facilitate the manufacture of various capacity machines with common parts, and may simplify repair and maintenance. The x-ray apparatus includes a vacuum chamber and a cathode assembly housed within the vacuum chamber. The use of a large vacuum chamber for multiple similar modules may reduce the cost of a large power device that provides a relatively large area of irradiation. The cathode assembly may include at least four modular filaments units, each containing a separate filament. In some embodiments, the modular filament units have filaments that resemble a straight line, and are arranged with the filament in each unit being parallel to the filament in another unit.

The x-ray apparatus may also include a liquid cooling source and an anode target assembly that includes a plurality of modular target units. Each modular anode target unit contains a material that generates x-rays when struck by free electrons and a cooling pathway which couples to the cooling pathway in an adjacent anode, with the cooling liquid source connected to these pathways. In some embodiments, the modular target units are arranged in a parallel linear array.

The x-ray apparatus may also include a window configured to allow the passage of the x-rays generated by the target assembly to create a radiation zone. In some embodiments, the window comprises multiple adjacent anode assemblies.

In some embodiments, the x-ray apparatus includes at least 4 modular filament units and at least 4 modular target units. In other examples, the x-ray apparatus includes at least 10 modular filament units and at least 10 modular target units.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
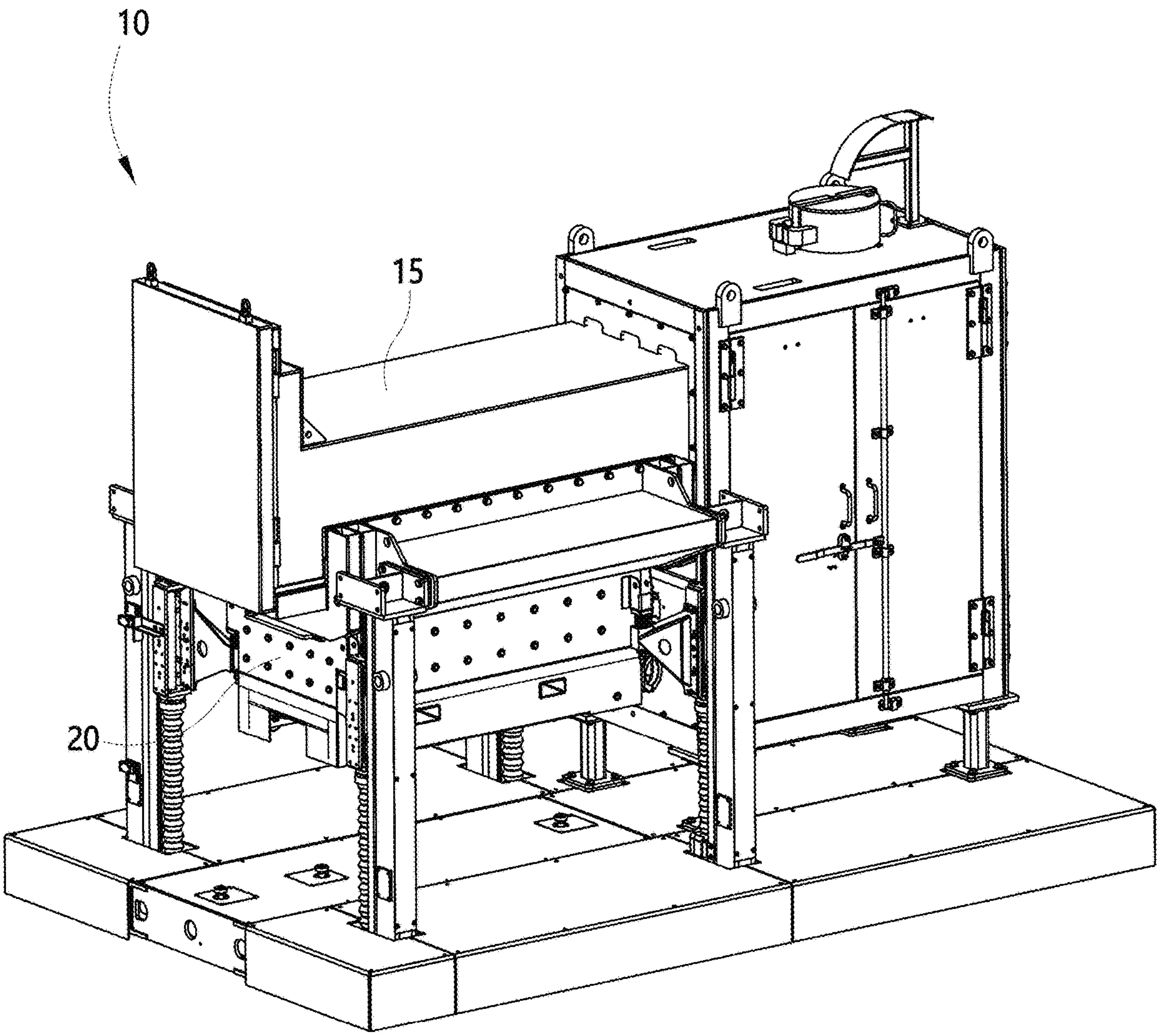
FIG. 1 is a perspective view of an x-ray machine incorporating applicant's invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates a perspective view of an x-ray apparatus 10. The x-ray apparatus 10 includes a vacuum chamber 15 and a reaction chamber 20. In the embodiment shown, the vacuum chamber 15 is positioned above the reaction chamber 20. The reaction chamber 20 can be lowered to allow sample parts to be irradiated by the x-ray apparatus 10 to be inserted into the reaction chamber. Once the sample parts are loaded into the reaction chamber 20, the reaction chamber 20 may be raised to be adjacent to the vacuum chamber 15 to allow for shielded irradiation. Although shown in a position below the vacuum chamber 15, in other embodiments, the reaction chamber 20 may be arranged in any other desired position with respect to the vacuum chamber 15 to receive radiation generated in the vacuum chamber 15. For example, the reaction chamber 20 may be positioned to a side of the vacuum chamber 15 or may be positioned above the vacuum chamber 15.

Figure 2:
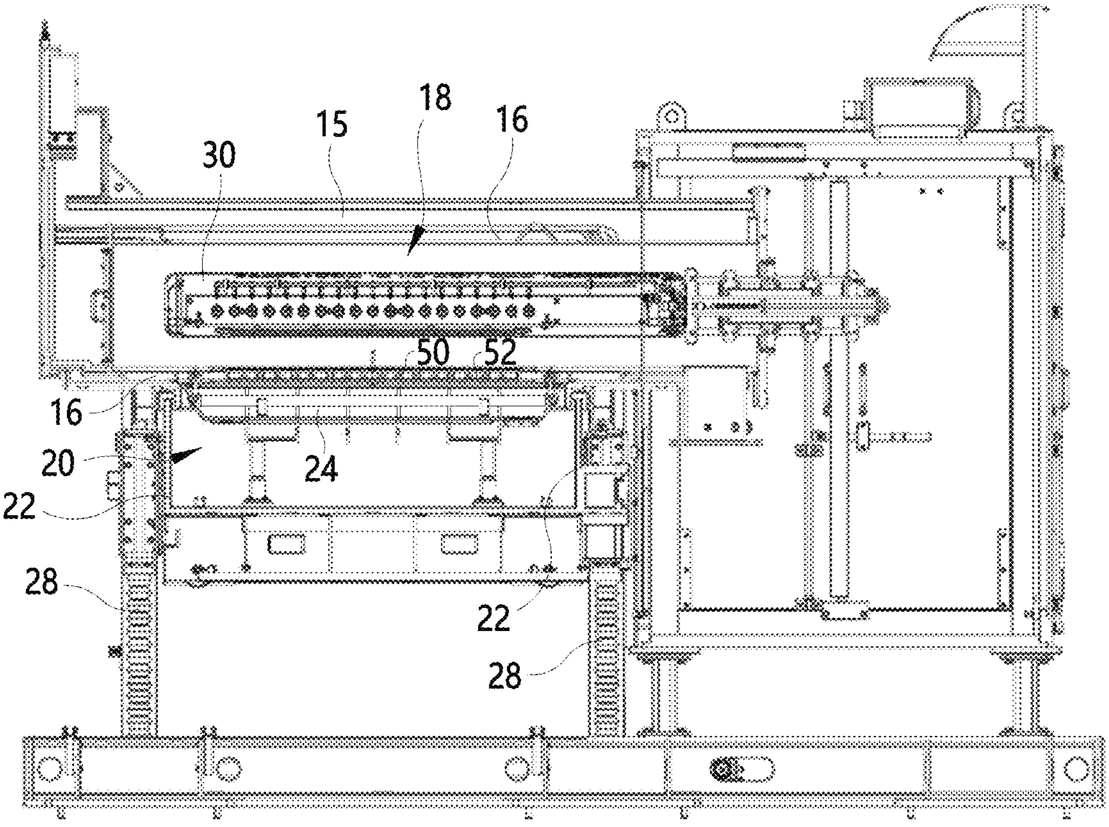
FIG. 2 is a cross-sectional front view of the x-ray machine of FIG. 1.

A cross-sectional front view of the x-ray apparatus 10 is illustrated in FIG. 2. The vacuum chamber 15 includes walls 16 that define a vacuum cavity 18. A cathode assembly 30 is housed within a vacuum cavity 18 of the vacuum chamber 15. A window 50 forms a portion of, or is included as a portion of, one of the walls 16 of the vacuum chamber 15. The window 50 is positioned between the cathode assembly 30 and the reaction chamber 20 to allow radiation generated within the vacuum chamber 15 to be directed into the reaction chamber 20. The window 50 includes an interior surface that faces the vacuum cavity 18 of the vacuum chamber 15. The window 50 also includes an exterior surface 52 that is exterior to the vacuum of the vacuum chamber 15 and faces the reaction chamber 20.

In the embodiments shown in FIG. 2, the reaction chamber 20 is positioned below the vacuum chamber 15. The reaction chamber 20 includes walls 22 that surround a ledge 24 for holding a product or products to be irradiated. In some embodiments, the position of the ledge 24 may be adjustable within the reaction chamber 20. Additionally, a set of vertical tracks 28 connects the reaction chamber 20 to the vacuum chamber 15. The reaction chamber 20 may be translated along the tracks 28 to adjust the position of the reaction chamber 20 with respect to the vacuum chamber 15. As an example, the reaction chamber 20 may be positioned near the bottom end of the tracks 28 so that there is separation between the reaction chamber 20 and the vacuum chamber 15 to allow a product or products to be arranged on the ledge 24 of the reaction chamber 20 in preparation for irradiation. The reaction chamber 20 may then be moved along the tracks 28 so that the reaction chamber is closer to the vacuum chamber 15 or in contact with the vacuum chamber 15 for irradiation.

Figure 6:
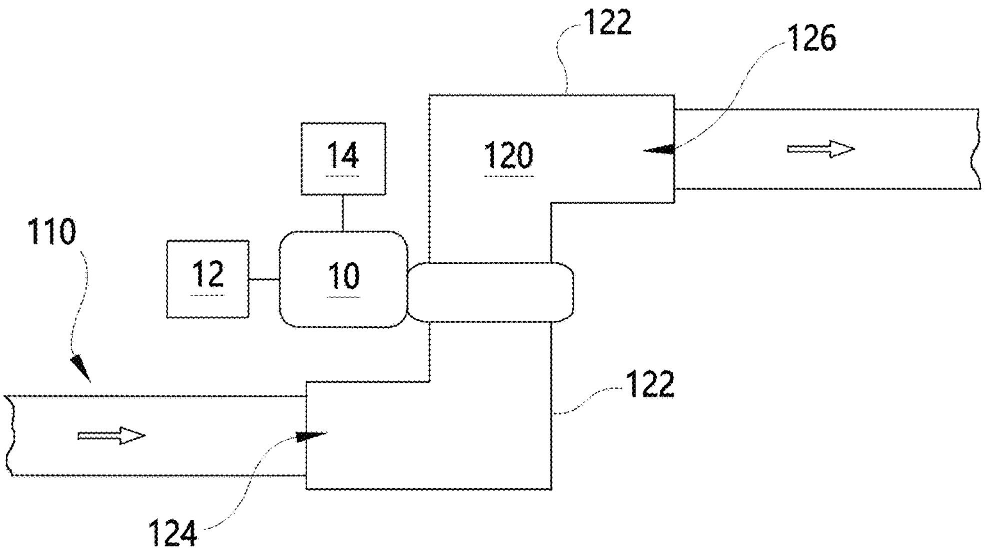
FIG. 6 is a representative diagram of the x-ray apparatus of FIG. 1, together with a power supply and cooling apparatus, installed in a continuous processing system.

The walls 22 of the reaction chamber 20 have a thickness that may include shielding to prevent x-rays that are introduced into the reaction chamber from escaping into the environment exterior to the reaction chamber. The thickness of the walls 22 may be modified to increase or decrease the amount of shielding as desired. In some embodiments, the majority of the walls 22 of the reaction chamber comprise average shielding of less than the equivalent of 2.0 inches of lead shielding. In other embodiments, the majority of area of the walls 22 of the reaction chamber comprise average shielding of less than the equivalent of 1.5 inches of lead shielding. In one example, the shielding is no more than the equivalent of 1.25 inches of lead. As an alternative, the reaction chamber may not be the only component with substantial shielding, but the entire unit itself, including the x-ray generating portion as well as the reaction chamber and pathways leading to and from it, may be shielded by side walls of comparable thickness to those described above for the reaction chamber, as schematically depicted in FIG. 6.

Figure 3:
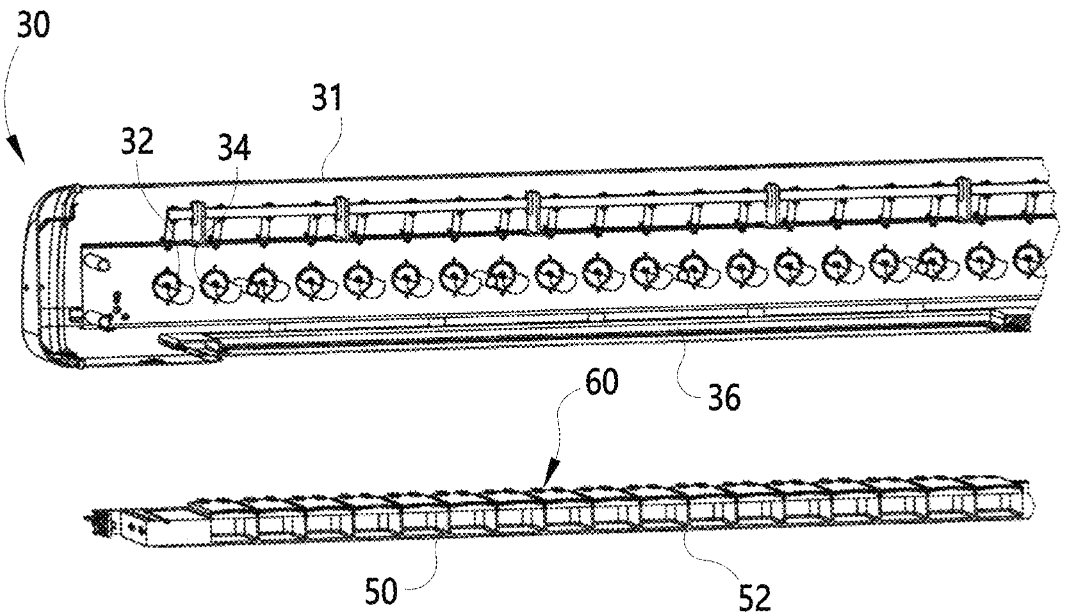
FIG. 3 is a cross-sectional perspective view of a portion of the vacuum chamber of the x-ray machine of FIG. 1.

A cross-sectional perspective view of some components within the vacuum chamber 15 is shown in FIG. 3. The cathode assembly 30 includes a cathode housing 31 that surrounds an array of filaments 32. In the embodiment shown, each filament 32 is positioned along a longitudinal axis of the cathode assembly 30; however, other arrangements of the filaments 32 may be used in alternative embodiments. A form grid 34 is positioned around a portion of each of the filaments 32. A screen grid 36 is located below the filaments 32 and the form grid 34. As shown, the screen grid 36 forms a portion of one side of the cathode housing 31. The form grid 34 and the screen grid 36 help to create a more uniform arrangement of the free electrons that are created at the cathode assembly.

The form grid 34 has a semi-circular shape that surrounds a portion of the filament 32. In other embodiments, different shapes may be used for the form grid 34. Additionally, in other embodiments, the form grid 34 may surround more or less of the filament 32, including the possibility of having no form grid. As shown in FIG. 3, the form grid 34 is arranged so that the form grid 34 is positioned between each of the filaments 32 and the screen grid 36.

In the embodiment shown, the cathode assembly 30 is arranged horizontally within the vacuum chamber 15. However, in other embodiments, the cathode assembly 30 may be arranged in a different orientation depending on the orientation of the vacuum chamber 15. As an example, the cathode assembly 30 may be arranged vertically or in an angled orientation. The reaction chamber 20 may be positioned accordingly to receive radiation created in the vacuum chamber 15 and exiting through the window 50.

In some embodiments, rather than having an array of multiple filaments, a single, large filament may be included in cathode assembly 30. The single filament may be used to heat either a single cathode or multiple cathodes that radiate electrons that may be used to create x-rays. Having multiple cathodes covering a larger area in a non-collinear manner may have an advantage in creating a more uniform distribution of electrons that may provide a more desirable and more uniform pattern of resulting x-rays. Ideally, the multiple cathodes are made of many similar modules placed in a line or in an array, with each module containing a filament that is positioned in a non-collinear orientation to another filament in another module, with all of these multiple cathode modules being in the same vacuum chamber.

In the embodiment shown in FIG. 3, a window 50 forms a portion of the bottom wall of the vacuum chamber 15. The window 50 is made from a conductive material, such as aluminum, that allows the passage of x-rays. The window 50 is designed to provide structural integrity to the vacuum chamber 15, as well as to maintain the seal for the vacuum. A structural external layer may be included on the window to provide increased strength that may be needed in some circumstances to withstand the forces placed on the window 50 by the external air pressure adjacent the vacuum. In some embodiments, a different underlying conductive material may be used as an alternative, copper for example, but at a higher cost given today's prices. In the embodiment shown, the window 50 is a rectangular-shaped plate that has been machined to include multiple sections and hollow openings defined through the sections. However, the window 50 is also designed to be relatively thin to maximize the x-rays that pass through the window 50 into the reaction chamber 20.

A target assembly 60 is supported by the window 50 and positioned within the vacuum cavity 18. The target assembly 60 includes an array of targets 62 (see FIG. 4) that are arranged collinearly to create a plane that is substantially perpendicular to the electrons emitted by the filaments 32 of the cathode assembly 30. Each of the targets 62 is a part of a module that includes a target sheet 64 coupled to a base plate 66 (see FIG. 5). A cooling passage 68 is defined between the target sheet 64 and the base plate 66. The cooling passage 68 is configured to allow a cooling fluid, either liquid or gas, to pass through to cool the target sheet 64. As an example, in some embodiments, water is the cooling fluid that passes through cooling passage 68 to cool the target assembly 60 and the window 50.

The cooling fluid may be provided to the cooling passage 68 from a cooling source 14 (see FIG. 6) that is in fluid communication with the cooling passage 68. In some embodiments, the cooling source 14 may be a dedicated source just for the x-ray apparatus 10, or it may be part of a larger system that is used for other cooling needs as well. In some embodiments, the cooling source 14 may be connected to the x-ray apparatus 10 by an on-machine manifold that is used to distribute the cooling fluid to the cooling passage 68 of the x-ray apparatus.

The target sheet 64 is made from a base material and plated with an x-ray generating layer 65 that is suitable for generation of x-rays upon impingement of electrons produced by the cathode assembly 30. The x-ray generating layer 65 may be added electro-chemically, mechanically, vapor depositing, sputtering, or by any other suitable process. Typically, the base material of the target sheet 64 is a metal that has a lower atomic number (a low Z material) such as aluminum, beryllium, or another suitable metal. The plating material is typically a material that has a high atomic number such as tungsten, gold, rhenium, platinum, iridium, lead or other similar materials. In some embodiments, the target sheet 64 is plated with a material that has an atomic number that is equal to or greater than 73. Using a thin layer of a relatively high atomic number material as the plating material increases the x-ray dose rate that is applied to the product in the reaction chamber 20 and minimizes the absorption of the x-rays as they are transmitted from the vacuum chamber 15 to the reaction chamber 20.

Figure 4:
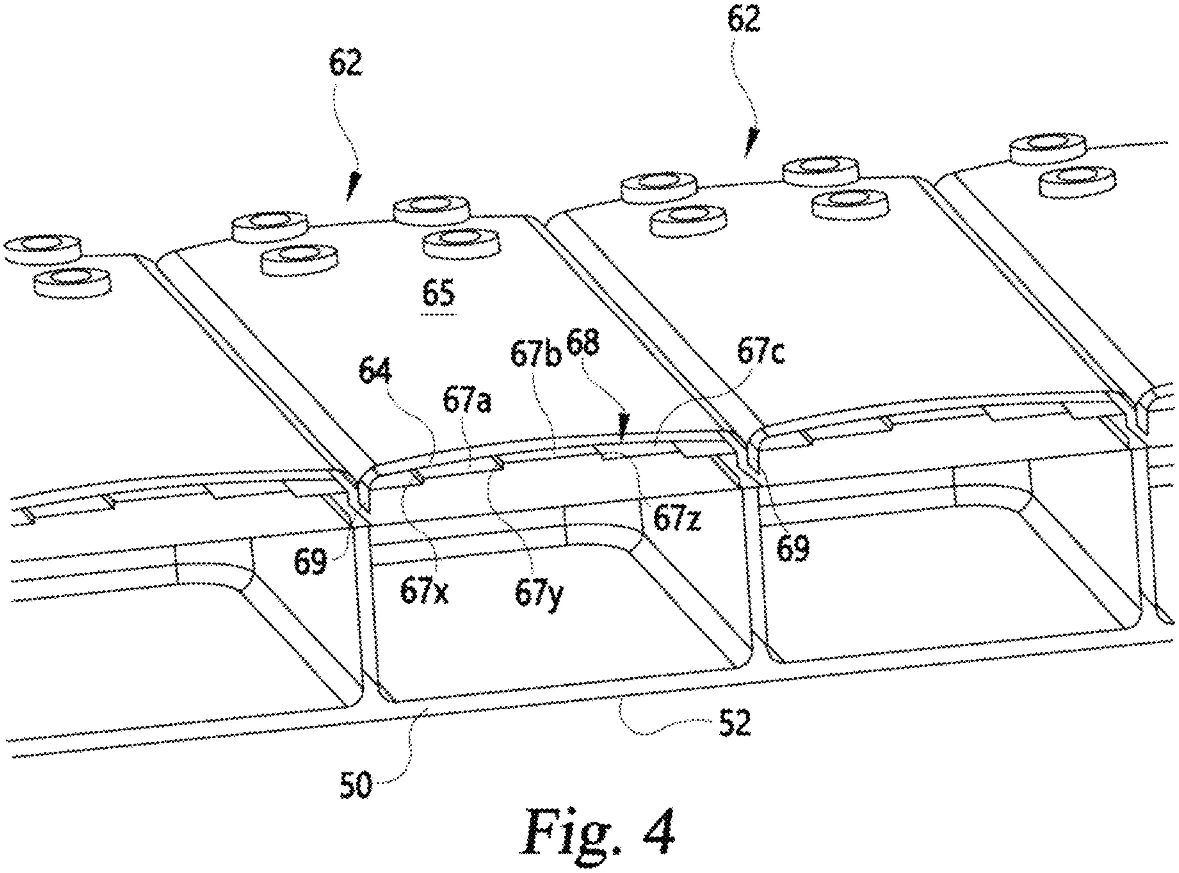
FIG. 4 is a cross-sectional view of a portion of the target assembly of the x-ray machine of FIG. 1 showing some adjacent anode modules.

As shown in FIG. 4, the target sheet 64 may be arched with respect to the base plate 66. In the embodiment shown, the target sheet 64 is attached to side edges 69 of the base plate 66 and arches over the top surface 67 of the base plate 66 so that the target sheet 64 does not contact the top surface 67 of the base plate 66, forming the cooling passage 68. The arched shape of the target sheet 64 allows for reduced stress on the base material of the target sheet 64 when the cooling fluid is passed through the cooling passage 68. However, it is not required that the target sheet 64 be arched. In other embodiments, the target sheet 64 may have another shape that allows for the creation of the cooling passage 68 between the target sheet 64 and the base plate 66. As an example, the target sheet 64 may have a rectangular shape with a flat top surface and flanges that extend from the flat top surface to attach to the side edges 69 of the base plate 66. As a still further alternative, the cooling pathways may be made by drilling, by molding, or by extrusion of a unitary material without having two separate adjacent entities, and then having one of its sides coated with the thin x-ray generating layer.

Each target sheet 64 is associated with a corresponding target anode module that has a cooling passage, structural support and an inner x-ray generating layer. By using such a modular approach, machines of different capacity can readily be made by changing the number of modules for both the cathodes and anodes, as the modules for each can be made the same width. The top surface 67 of the base plate 66 may be a stepped surface. The top surface 67 is formed by several parallel surfaces such as 67*a*, 67*b*, and 67*c* of varying heights. The parallel surfaces are connected to adjacent parallel sides by risers 67*x*, 67*y*, and 67*z* that are perpendicular to the parallel surfaces. The stepped top surface 67 helps to distribute the cooling fluid evenly over the width of the base plate 66 to increase the cooling effect of the cooling fluid. However, in other embodiments, the top surface 67 may have any other desired shape that still allows for a cooling passage 68 between the target sheet 64 and the base plate. As an example, the top surface 67 may be curved to match the arch of the target sheet 64, or the top surface 67 of the base plate 66 may be flat. The entire array may be unitary and may be cast, extruded, or drilled or otherwise machined as desired, to provide the desired cooling fluid passages, while being coated on the inner side that is in the vacuum chamber with a thin layer of x-ray generating material.

The target assembly 60 in combination with the window 50 acts as an anode for operation with the cathode assembly 30. The power supply 12 connected between the cathode assembly 30 and the target assembly 60, provides a voltage difference between them so that electrons generated at the filaments 32 of the cathode assembly 30 are accelerated toward the target assembly 60 and impinge on the targets 62 to generate x-rays. In some embodiments, a negative voltage is generated at the cathode assembly 30 and the target assembly 60 may be grounded or given a positive voltage to create the voltage difference between the cathode assembly 30 and the target assembly 60. The electron accelerating voltage and current may be selected to achieve the highest x-ray dose rate for the product to be irradiated while staying within the limitations of the high voltage power source and shielding limitations.

The combination of the target assembly 60 and the window 50 forms an electron blocking path that begins at the x-ray generating layer 65 and continues through the window 50 to the exterior of the vacuum chamber 15. This electron blocking path includes the base material of the target sheet 64 as well as the base plate 66 and the window. The blocking path blocks at least 70% of the free electrons that are generated at the cathode assembly 30 and reach the target assembly 60 from continuing through the window 50 and exiting into the reaction chamber 20. However, the electron blocking path allows x-rays that are generated at the x-ray generating layer 65 of the target 62 to continue along the blocking path and to exit through the window 50 into the reaction chamber 20. The materials used for the target sheet 64, the base plate 66, and the window 50 may be chosen to maximize the number of electrons that are blocked and to maximize the number of x-rays that are allowed to pass through to the reaction chamber 20. In other embodiments, more or fewer free electrons may be blocked by the blocking path. For example, in some embodiments, the selectively blocking path blocks over 95% of the free electrons reaching the target assembly 60 from continuing on to exit through the window 50.

Figure 5:
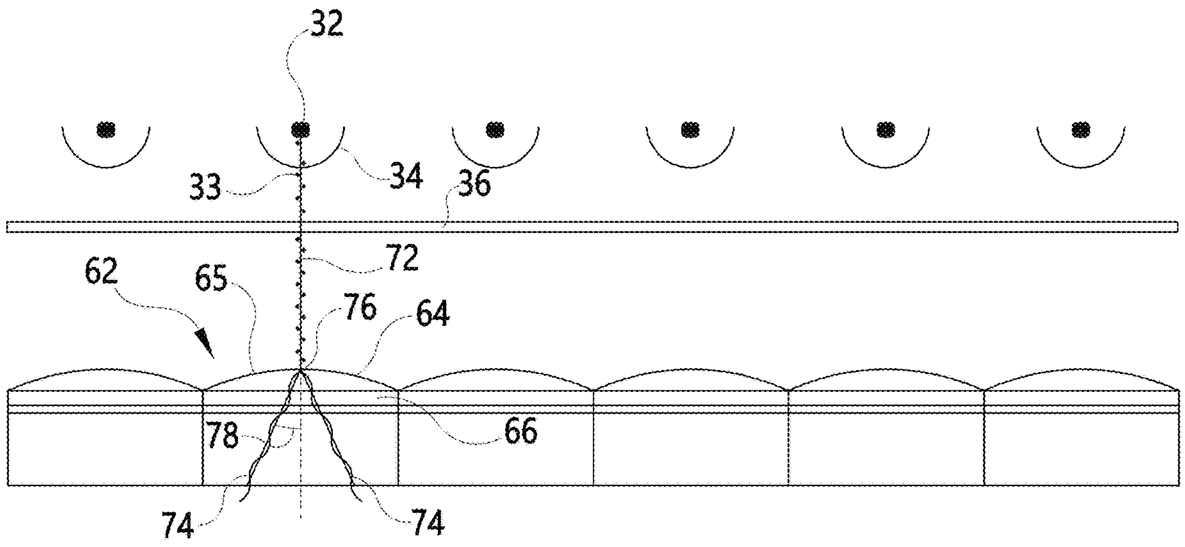
FIG. 5 is a diagram of the generation of the typical dispersion pattern for x-rays generated at the target assembly of the x-ray machine of FIG. 1.

FIG. 5 is a diagram to help illustrate the generation of the typical dispersion pattern for x-rays generated at the target assembly of the x-ray machine of FIG. 1. Initially, free electrons 33 are produced at filament 32 when a current is supplied to heat it. While those electrons take diverse paths, FIG. 5 shows an example path 72 that an electron may take from filament 32 to target anode 62. Ideally, the paths of all of the electrons are spaced rather uniformly by the time they reach the target assembly 60, so that the resultant x-ray pattern is correspondingly uniform. To aid in the more uniform spacing of electrons, the free electrons 33 pass through form grid 34 and then the screen grid 36 which together help achieve the desired uniformity of the free electrons reaching the target assembly 60. Free electrons are accelerated by the voltage difference between the cathode assembly 30 and the target and the target assembly 60. In our example shown, path 72 is oriented so that example free electrons 33 will impinge upon the x-ray generating layer 65 of the target 62. The x-rays 74 created by the x-ray generating layer 65 spread from the x-ray generating layer 65 through the target sheet 64, the cooling passage 68, the base plate 66, and finally through the exterior surface 52 of the window 50. The x-rays 74 spread in a cone-type pattern, but generally continue in the same direction as the free electrons 33 were travelling, away from the filament 32 and the cathode assembly 30 and toward the anode target assembly 60. In some embodiments, over 60% of the x-rays 74 generated by the x-ray generating layer 65 of a target 62 proceed in a path within 30° (see angle 78 in FIG. 5) of a line through the nearest point on the cathode assembly 30 and point of generation of the x-ray. The vertex 76 of the 30° measurement is at the point of generation of the x-ray 74 at the x-ray generating layer and extending outward through the window 50.

In some embodiments, the electron accelerating voltage between the cathode and the anode may be less than 400 kV and more preferably less than 320 kV, while the power provided by the power supply 12 is greater than 80 kW and more preferably greater than 120 kW and most preferably at about 200 kW or greater. In other embodiments, the voltage may be in a range between 200 kV and 320 kV. The combination of relatively low voltage and relatively high power allows for several benefits with respect to irradiation, curing, inactivation, disinfection, or sterilization of the products that are inserted into the reaction chamber 20. The low voltage allows treatment of smaller boxes and packages. Higher energy x-rays would have a tendency to pass through these smaller boxes and packages without providing sufficient radiation to sterilize the products within the box or package in a short enough time. The use of a lower voltage produces lower energy x-rays that will be absorbed more readily by a smaller box.

The use of lower voltages that create lower energy x-rays also reduces the amount of shielding that is needed to prevent exposure to the x-rays in the environment exterior to the reaction chamber 20. Reduced shielding decreases the cost of the x-ray apparatus 10 and decreases the weight and size of the x-ray apparatus 10. The decreased size and weight of the x-ray apparatus 10 makes the x-ray apparatus 10 more suitable for inclusion on an assembly line with other processing machines. The large, wide array created by having multiple filaments 32 and multiple targets 62 enables the x-ray apparatus 10 to provide high power with relatively lower energy x-rays to irradiate more material with reduced shielding and lower cost.

The arrangement of the window 50 and the target assembly 60 shown in FIGS. 3-4, is a representative example of one possible arrangement. Other suitable arrangements may be used as desired to generate x-rays and to allow the x-rays to exit the vacuum chamber through the window 50. As an example, in some embodiments, the target assembly 60 may be integral with the window 50. In other embodiments, the target assembly 60 may have its own support structure within the vacuum cavity 18 so that the target assembly 60 is not directly supported by the window 50. Additionally, the arrangement of the anode may be modified as desired so that in some embodiments, only the window 50 acts as the anode or only the target assembly 60 acts as the anode.

The dimensions of the x-ray apparatus 10 shown in FIG. 1 are merely representative and can be modified in other embodiments to create an x-ray machine that is capable of irradiating a smaller or larger area as needed. The arrangement of the filaments 32 and the targets 62 of the target assembly 60 create modular cathode units and modular anode units that can be of a standard design that can be incorporated in different size arrays for different equipment that is constructed for lower cost than if non-standard sizes of arrays were constructed. The cathode assembly 30 may include fewer filaments 32 in an x-ray apparatus 10 that irradiates a smaller area or may include more filaments 32 in an embodiment designed for a larger irradiation area. Likewise, the target assembly may include fewer targets 62 in an x-ray apparatus 10 that irradiates a smaller area or may include more targets 62 in an embodiment designed for a larger irradiation area. In some embodiments, the number of filaments 32 may be equal to the number of targets 62, but in other embodiments, the number of filaments 32 may be different than the number of targets 62. In one representative example, the filaments 32 of the cathode assembly 30 may be arranged collinearly and so that the center of a filament 32 is spaced 3 inches from the center of an adjacent filament 32. The target assembly 60 includes targets 62 that are 3 inches in width and the center of each target 62 is aligned with the center of a corresponding filament 32. The number of filaments 32 may be reduced or increased and a corresponding change in the number of targets 62 may be made to alter the area of irradiation in 3-inch increments. In other embodiments, the distance between the filaments 32 and the width of the targets 62 may be increased or decreased as desired.

Although reaction chamber 20 is shown as a singular chamber useful for batch processing in FIG. 1, in other embodiments, the x-ray apparatus 10 may be part of an assembly line or a circuitous conveyor line and operate in cooperation with other machines. As illustrated in FIG. 6, the x-ray apparatus 10 can be installed with a conveyor system 110 with turns in it to more safely deliver a product to be irradiated to the x-ray apparatus 10 for continuous processing. After the product is passed through the reaction chamber 120 of the x-ray apparatus 10, the product continues downstream to be delivered to other devices on the conveyor system 110. FIG. 6 also schematically illustrates the power supply power supply 12 and cooling water source 14 that function as parts of the x-ray apparatus of FIG. 1.

In this embodiment, the reaction chamber 120 surrounds a portion of the conveyor system 110. The walls 122 of the reaction chamber 120 provide shielding that prevent harmful x-ray radiation from escaping to the surrounding environment. As shown, in some embodiments, the reaction chamber 120 may have an input path 124 and an output path 126. The reaction chamber 120 input and output paths may also include turns or 90 degree angles that aid in shielding the radiation produced by the x-ray apparatus 10. As with the reaction chamber 20 already described, the low voltage, high power characteristics of the x-ray apparatus 10 helps to minimize the amount of shielding necessary and can increase the rate of absorption of the x-rays in small products being irradiated. Reduced shielding decreases the weight and cost of the reaction chamber 120 and allows for greater portability and reduces the footprint of the x-ray apparatus 10 and the reaction chamber 120 to allow for efficient placement on the conveyor system 110.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An x-ray apparatus, comprising:

a vacuum chamber having a window for exit of x-rays, said window having an exterior surface outside of the vacuum in the vacuum chamber;

a cathode within said vacuum chamber;

a solid target anode associated with said window, said target at de having an interior surface within said vacuum Chamber;

a less than 400 kV but more than 80 kW power supply connected between said cathode, and target anode whereby free electrons are accelerated in their flow from said cathode to said target anode within said vacuum chamber;

said interior surface of said target anode comprising an associated x-ray generating layer comprising one or more of an element with an atomic number equal to or greater than 73;

a selectively blocking path beginning at the x-ray generating layer and continuing through the remaining portion of said target anode where said selectively blocking path blocks over 70% of the free electrons reaching said target anode from continuing on to exit through the window, while allowing x-rays leaving the x-ray generating layer to continue along the selectively blocking path to exit through the window; and a liquid cooling pathway associated with said target anode between said x-ray' generating layer and the exterior surface of the window for heat transfer from the target anode;

wherein said target anode includes a base plate including stepped surfaces in which risers of said stepped surfaces have sides perpendicular to parallel surfaces of said stepped surfaces.

2. The x-ray apparatus of claim 1, in which said cathode comprises at least 4 separate and non-collinear filaments.

3. The x-ray apparatus of claim 1, in which said target anode has a solid structure, the majority of which comprises aluminum, wherein the liquid in the cooling pathway comprises water, and wherein the x-ray generating layer comprises gold.

4. The x-ray apparatus of claim 1, in which said selectively blocking path beginning at the x-ray generating layer and continuing through the remaining portion of said target anode blocks over 95% of the free electrons reaching said target anode from continuing on to exit through the window, while allowing x-rays leaving the x-ray generating layer to continue to exit through the window.

5. The x-ray apparatus of claim 1, in which over 60% of the x-rays generated in said x-ray generating layer proceed in a path within 30° of a line through the nearest point on the cathode and a point of generation of the x-ray, as measured with a vertex of the 30° measurement at the point of generation and extending outward through the window.

6. An x-ray apparatus, comprising:

a vacuum chamber having a wall and a window in said wall to allow exit of x-rays with a vacuum existing in said vacuum chamber;

a cathode assembly housed within said vacuum chamber, wherein said cathode assembly includes at least four non-contiguous filaments;

a liquid cooled window anode that incorporates a cooling path in which sides of the cooling path provide structural support for the window to keep a vacuum in said chamber;

a power supply connected between said cathode assembly and window anode, whereby free electrons are accelerated in their flow from said cathode assembly to said window anode within said vacuum chamber;

said window anode containing a thin layer of a target material that has an atomic number equal to or greater than 73, whereby the thin layer is of sufficient thickness that a majority of electrons reaching the window anode will be absorbed by said thin layer and whereby the thin layer is of sufficient thinness that resulting x-rays can exit the other side of said thin layer and thereafter exit from the window anode through the window; and wherein said cooling path is between a base plate with stepped surfaces and curved segments coated with the target material.

7. The x-ray apparatus of claim 6, further comprising:

a reaction chamber having one or more shielded sides, said reaction chamber being configured to hold a product to be treated; and positioned to receive x-rays passing through said window and into said reaction chamber for irradiation of a product to be treated in said reaction chamber.

8. The x-ray apparatus of claim 7, wherein a majority of sides of said reaction chamber have an average shielding of less than the equivalent of 2.0 inches of lead shielding.

9. The x-ray apparatus of claim 7, wherein a majority of sides of said reaction chamber have an average shielding of less than the equivalent of 1.5 inches of lead shielding.

10. The x-ray apparatus of claim 9, in which the lead shielding is no more than 1.25 inches.

11. The x-ray apparatus of claim 6, in which the thin layer is gold or platinum.

12. The x-ray apparatus of claim 11, in which the thin layer is gold.

13. The x-ray apparatus of claim 11, in which the thin layer is on adjacent curved surfaces made of aluminum or copper.

14. The x-ray apparatus of claim 13, wherein said base plate is formed from aluminum.

15. The x-ray apparatus of claim 14, wherein said stepped surfaces include risers that have sides perpendicular to parallel surfaces of said stepped surfaces.

16. The x-ray apparatus of claim 6, wherein a voltage difference between said cathode assembly and said target material is less than 400 kV.

17. The x-ray apparatus of claim 16, in which the voltage difference between said cathode assembly and said target material is between 200 kV and 320 kV.

18. An x-ray apparatus with modular cathodes and modular anodes within one vacuum chamber, comprising:

a vacuum chamber;

a cathode assembly housed within said vacuum chamber, wherein said cathode assembly, includes at least four modular filaments units, each containing a separate filament;

a liquid cooling source;

an anode target assembly, including a plurality of modular anode target units each a. containing a material that generates x-rays when struck by free electrons, b. containing a cooling pathway which couples to the cooling pathway in an adjacent modular anode target unit, with said cooling liquid cooling source connected to these pathways;

c. containing a base plate including stepped surfaces in which risers of said stepped surfaces have sides perpendicular to parallel surfaces of said stepped surfaces;

a window configured to allow passage of the x-rays generated by said anode target assembly to create a radiation zone outside of said vacuum chamber; and a less than 400 kV but more than 80 kW power supply connected between said cathode assembly and anode target assembly, whereby free electrons are accelerated in their flow from said cathode assembly to said anode target assembly within said vacuum chamber.

19. The x-ray apparatus of claim 18 in which said modular target anode units are arranged in a parallel linear array.

20. The x-ray apparatus of claim 19, in which said modular filament units have filaments that resemble a straight line, and are arranged with the filament in each modular filament unit being parallel to the filament in another modular filament unit.

21. The x-ray apparatus of claim 20, in which there are at least 4 modular target units.

22. The x-ray apparatus of claim 21, in which there are at least 10 modular filament units and 10 modular target units.

23. The x-ray apparatus of claim 19, in which said window comprises adjacent modular anode assemblies.

* * * * *